(12) United States Patent
Phong et al.

(10) Patent No.: US 7,006,100 B2
(45) Date of Patent: Feb. 28, 2006

(54) CACHE MEMORY SYSTEM

(75) Inventors: Kah-Ho Phong, Singapore (SG); Lucas Y. W. Hui, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 77 days.

(21) Appl. No.: 10/677,629

(22) Filed: Oct. 2, 2003

(65) Prior Publication Data

US 2004/0141554 A1    Jul. 22, 2004

(30) Foreign Application Priority Data

Oct. 2, 2002   (SG)   ................................. 200206023

(51) Int. Cl.
  G09G 5/36     (2006.01)
  H04N 7/12     (2006.01)
  G06F 13/00    (2006.01)

(52) U.S. Cl. ................. 345/557; 375/240.16; 345/536; 711/119

(58) Field of Classification Search ................ 345/557, 345/530, 536; 375/240.16, 240.12; 348/416.1, 348/699, 413.1; 711/118, 119, 129, 139, 711/132, 3

See application file for complete search history.

(56) References Cited

U.S. PATENT DOCUMENTS

| | | | |
|---|---|---|---|
| 5,510,857 A * | 4/1996 | Kopet et al. ................ | 348/699 |
| 5,535,288 A * | 7/1996 | Chen et al. ................ | 382/236 |
| 5,696,698 A * | 12/1997 | Herluison et al. ......... | 345/557 |
| 5,995,668 A * | 11/1999 | Corset et al. ............... | 382/233 |
| 6,005,624 A * | 12/1999 | Vainsencher ........... | 375/240.14 |
| 6,222,883 B1 * | 4/2001 | Murdock et al. ...... | 375/240.16 |
| 6,342,895 B1 * | 1/2002 | Kim ........................... | 345/531 |
| 6,553,552 B1 * | 4/2003 | Khan et al. .................. | 716/10 |
| 6,567,091 B1 * | 5/2003 | Dye et al. ................... | 345/501 |
| 6,753,871 B1 * | 6/2004 | Ju ............................... | 345/531 |
| 2001/0050955 A1 * | 12/2001 | Zhang et al. .......... | 375/240.12 |
| 2002/0101536 A1 * | 8/2002 | Cook et al. ................ | 348/453 |
| 2002/0103977 A1 * | 8/2002 | Ewoldt ....................... | 711/140 |

OTHER PUBLICATIONS

"Hardware Circular Buffer", http://www.hyperdictionary.com/computing/hardware+circular+buffer.*

* cited by examiner

Primary Examiner—Kee M. Tung
Assistant Examiner—Joni Hsu
(74) Attorney, Agent, or Firm—Lisa K. Jorgenson; Robert Iannucci; Seed IP Law Group PLLC

(57) ABSTRACT

A cache memory system is used in a motion estimation system. The system includes: a first cache memory defined in terms of a first width and a first height, and a second cache memory defined in terms of a second width and a second height, wherein said second height is less than said first height, the cache memory system being operable in one of two modes: the first mode being characterized by banks of memory from the second cache memory being concatenated vertically such that their concatenated height is at least equal to the first height, and said concatenated banks being arranged to be appended to the width of the first cache memory to form a single contiguous address space; and the second mode being characterized by banks of memory from the first and second cache being stacked vertically, and being arranged to be addressed as two separate address spaces.

25 Claims, 18 Drawing Sheets

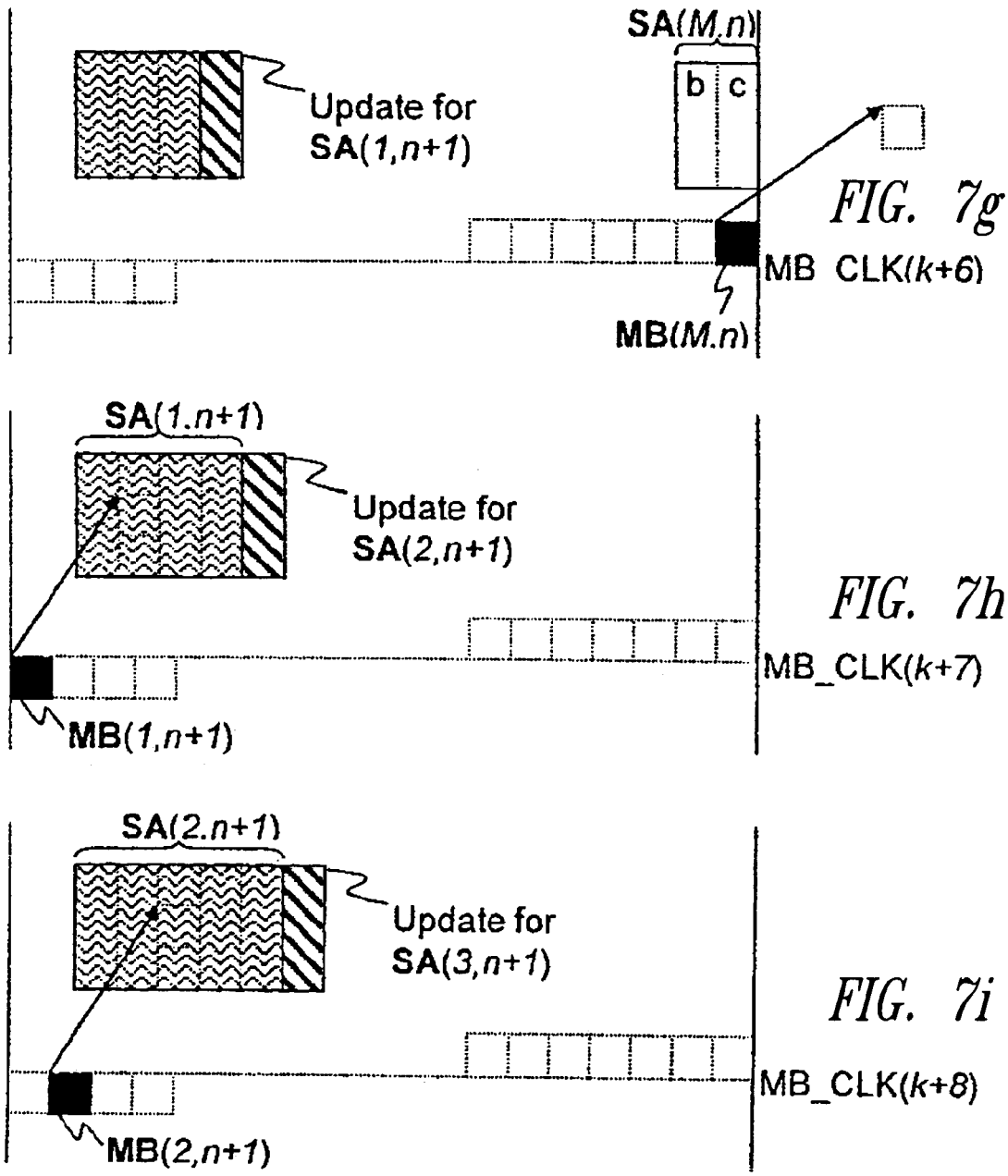

CACHE MEMORY SYSTEM

BACKGROUND OF THE INVENTION

1. Field of the Invention

The present invention relates to a cache memory system for a motion estimation circuit used in video processing or video compression applications.

2. Description of the Related Art

Video compression, as performed by MPEG (Motion Picture Coding Experts Group) standards, and other similar systems, is used prior to storage or transmission of video sequences to reduce the data volume or data rate involved. Generally, it has been found that when there is little motion between successive frames, there is a high degree of temporal redundancy between these frames. As such, it is inefficient to store or transmit an entire data block of each frame to reliably recreate the image at the decoder. Instead, the encoder needs only to describe or encode the changes or motion of objects between successive frames. Often this involves motion estimation between portions of successive frames of video. In this way, the efficiency of the transmitting or storage system can be greatly improved by reducing the amount of data to be processed.

Motion estimation is a method of predicting a current frame from a reference frame. A reference frame is any frame other than the current frame, and motion estimation can be used to exploit temporal redundancy between the frames. One of the most common approaches is block-based motion estimation. In this scheme, a frame is divided into blocks of pixels, each block referred to as a "macroblock." Each pixel has an associated co-ordinate within the frame, as well as an integral value representing luminosity content at that co-ordinate. Each macroblock has an associated co-ordinate, which is usually that of the top-leftmost pixel of the macroblock.

To estimate motion, each macroblock in the current frame (hereinafter called "reference macroblock") is compared against macroblocks in a region of a reference frame (hereinafter called "search area"). The difference between the co-ordinate of the reference macroblock and the co-ordinate of the macroblock in the search area that best matches the reference macroblock gives the motion vector. Determining the best match usually involves the comparison of a further metric, commonly being the sum of absolute differences between pixels in the reference macroblock and the corresponding pixels in the matched macroblock.

Cache memory is commonly employed to store the search area and reference macroblock to reduce memory access bandwidth. Memory access bandwidth can be further reduced by ensuring a sequential relationship in search areas of sequentially adjacent reference macroblocks. One way of achieving this is to have the same search area offset for reference macroblocks in the same row (also called a slice). The non-overlapping region of search areas corresponding to two adjacent reference macroblocks in the same slice has exactly the width as one macroblock and the same height as the search area. Except at the first reference macroblock of each slice, the method described above requires only one macroblock column to be updated to the search area cache for motion estimation of successive reference macroblocks in the same slice. Generally, if the search area size and processing time for motion estimation of every reference macroblock is the same, when processing the last reference macroblock of a current slice, the entire search area of the first reference macroblock of the next slice would have to be loaded to cache, instead of just one macroblock column. This increases memory access bandwidth as well as requiring the cache to be double-buffered.

U.S. Pat. No. 5,696,698, which is incorporated herein by reference in its entirety, describes one such device for addressing a cache memory of a motion picture compression circuit, in which banks of memory are arranged to store the search area, whereby successive motion estimation requires only partial loading of the required search area when the next reference macroblock has a sequential adjacent relationship with respect to the current reference macroblock.

It is found that object motion typically has a wider horizontal range then vertical range. Furthermore, efficiency is increased if forward/backward as well as foreground/background motions are detected in certain cases. This involves performing motion estimation on two search areas for each reference macroblock. Cache which is needed to minimize memory access bandwidth is costly, and it is desirable to provide cache memory as efficiently as possible.

It is difficult to use a simple cache device or method such as described in U.S. Pat. No. 5,696,698 to support two search areas simultaneously. In particular, the two search areas do not necessarily have any relationship in terms of reference frame source or position.

BRIEF SUMMARY OF THE INVENTION

In a solution using two prior art cache devices for supporting two search areas, the devices cannot be easily combined to support a single wide search area with both larger horizontal and vertical size. There will be an overhead in terms of cache memory size, typically taking the worst case dimension of the single wide search area and the two smaller search areas combined.

An embodiment of the present invention minimizes the overall cache size. In particular it minimizes total size of a cache which can be used for storing a single large search area, or two smaller search areas. The embodiment also facilitates memory access bandwidth control when operating across slices to eliminate the need for double-buffered cache associated with the prior art.

In a first broad form, an embodiment of the present invention provides a cache memory system for use in a motion estimation system, including: a first cache memory defined in terms of a first width and a first height, and a second cache memory defined in terms of a second width and a second height, wherein said second height is less than said first height, the cache memory system being operable in one of two modes:

the first mode being characterized by banks of memory from the second cache memory being concatenated vertically such that their concatenated height is at least equal to the first height, and said concatenated banks being arranged to be appended to the width of the first cache memory to form a single contiguous address space; and the second mode being characterized by banks of memory from the first and second cache being stacked vertically, and being arranged to be addressed as two separate address spaces.

Preferably, the first and second widths are equal.

Preferably, the first mode is for use with a motion estimation system having a single search area.

Preferably, the second mode is for use with a motion estimation system having two separate search areas.

Preferably, the two search areas are of equal size.

Preferably a motion estimation system is provided including the cache memory system according to a broad form of the present invention.

Preferably, the motion estimation system is operable according to an MPEG standard.

Preferably, the cache memory system is arranged to be addressed as a circular buffer.

Preferably, the means for addressing the cache memory system includes: a start pointer for indicating the start of a search area; an update pointer for indicating a bank being updated; and a search width parameter for indicating the extent of the search area.

Given the dimensions of the large search area plus the update area is [W,H], and the maximum dimensions of each of the two smaller search areas plus the update area, is [w,h] (without any necessity for them to be similar in dimension), and that W>w and H>h, two caches can be designed with each having a number of banks of memory having the width of the update area U. The first cache (cache one) has [w/U] (/denotes division with rounding up to nearest integer) banks of memory of height H, and the second cache (cache two) has [max(w/U, 2×(W−w)/U)] banks of memory of height [max(2h−H, H/2)].

For a cache to store two smaller search areas, a thick mode cache is configured by concatenating cache one and cache two vertically. Cache one is formed by arranging its memory banks into one row by concatenating them horizontally. Cache two is formed likewise with its memory banks. If (w/U<2×((W−w)/U)) then cache two has [2×((W−w)/U)−(w/U)] banks which are not used in this cache mode. Each bank in cache one together with its corresponding vertically concatenated bank in cache two forms one logical memory bank. Thick mode cache is therefore formed by [w/U] logical memory banks of height [H+max(2h−H, H/2)]. The thick mode cache is then divided horizontally into upper and lower portions, each portion able to store a search area of [w,h]. The search area stored in the upper portion is hereinafter called search area one, and the search area stored in the lower portion is hereinafter called search area two. Thick mode cache has zero cache overhead in terms of unused cache memory when (W≦3w/2) and (H≦4h/3).

For a cache to store a single large search area, a wide mode cache is configured by concatenating cache one and cache two horizontally. Cache one is formed as before. Cache two is formed by arranging its memory bank into two rows, each row formed by concatenating a number of banks horizontally, and then concatenating the two rows vertically, If (w/U>2×((W−w)/U)) then cache two has [(w/U−2×((W−w)/U)] banks which are not used in this cache mode. Each bank in cache one is one logical memory bank, while a pair of banks concatenated vertically in cache two is one logical memory bank. Wide mode cache is therefore formed by [W/U] logical memory banks of height H. Wide mode cache itself is able to store a search area of [W,H]. Wide mode cache has zero cache overhead in term of unused cache memory when (W≧3w/2) and (H≧4h/3).

By designing a re-configurable cache with a thick and a wide mode using two such smaller caches, the overall size of the cache memory can be optimized to support both a large search window or two smaller search windows.

The flexibility and efficiency of the re-configurable thick/wide mode cache is enhanced by means of two pointers—an update pointer indicating the current banks of memory in the cache to be updated, and a start pointer(s) and associated search width parameter(s) for indicating the current search area(s) in the cache. The update pointer points to one logical bank which is the current update bank. The start pointer points to one logical bank which contains one end of the search area, and the extent of the search area given by a search width parameter which value indicates, with respect to the location of the start pointer, the range of consecutive logical banks that contain the search area.

By utilizing the update pointer and start pointer, a method is provided for cache updating with a flexible search area width reduction such that when performing motion estimation across a slice there is no increase in memory access bandwidth or need for cache double-buffering.

For performing motion estimation of a current frame, the frame is divided into several slices of macroblocks. Each macroblock may have an associated search area offset (hereinafter called global motion vector or GMV) to enhance effective search range. All macroblocks in the same slice may have the same GMV to simplify caching. This value gives the location of the search area in the reference frame with respect to the location of the macroblock.

The two caches can be regarded as being concatenated "logically," resulting in a "logical cache" that is either a wide mode cache or a thick mode cache. The resultant logical cache is made up of one row of "logical banks of memory," with each logical memory bank being made up of either one physical memory bank, or two physical memory banks concatenated vertically. Those skilled in the art will understand how to logically concatenate physical memory banks to achieve the logical memory banks of the logical memory caches described herein. For example, one could logically concatenate two physical memory bank simply by employing a memory map that associates with the physical addresses for the second bank logical addresses that vertically follow the logical addresses of the first bank.

The logical memory banks function like a circular linked buffer. Having configured a cache for storing the search areas, cache addressing uses the following method. An update pointer indicates the current logical bank which is being loaded or written with new search area data. The update pointer increments by one in a circular (mod-n, where n is the number of logical banks) manner, i.e., if the current update pointer points to the last logical bank, it will point to the first logical bank at its next increment. A start pointer and search width parameter indicate the region of the cache containing the current search area which is being read for the motion estimation process. One set of start pointer and search width parameter is used for each search area. Each set is independently controlled. In thick cache mode, the two search areas are each controlled by a separate set. In wide cache mode, only one set is used. For each start pointer, the associated search width parameter gives the number of consecutive logical banks, starting from the bank pointed to by the start pointer, that constitutes the width of the search area. The value of the search width parameter is limited by the position of the update pointer.

A current frame has N slices, each made up of M macroblocks. When performing motion estimation on the $m^{th}$ macroblock, one macroblock column corresponding to the non-overlapping search area region of the $(m+1)^{th}$ macroblock is loaded into the cache. At the motion estimation of the $(m+1)^{th}$ macroblock, the update pointer increments by one, the start pointer increments by one, while the search width parameter remains at full width. In normal mode motion estimation, motion estimation is performed on a full search area and the cache is updated with the non-overlapping search area region for the next macroblock in the slice. When performing motion estimation for macroblocks near the left or right edges of the frame, search area width reduction may take place.

In search area width reduction mode, motion estimation takes place on a smaller search area. The search width may be reduced for two reasons. Firstly, it may be that a GMV is offset such that part of or the complete search area is outside the reference frame. In this case, motion estimation generally takes place on the portion of the search area that is still within the reference frame, or for cases where it is completely outside the frame, a search area (generally half of the full search area) that is "closest" to the GMV. Secondly, it may be to cater for the preloading of the search area of the first macroblock of the next slice. In order to limit memory access bandwidth, only one macroblock column is loaded to cache per macroblock motion estimation period and the preloading is spread over a few macroblock motion estimation periods. Instead of loading the non-overlapping search area region for the next macroblock, the cache is updated with one macroblock column of the search area for the first macroblock of the next slice. Since there is no new search area updated for the current slice, subsequent motion estimations of the remaining macroblocks in the current slice take place on a reduced width. Generally the search width will be reduced by one macroblock at every subsequent motion estimation until the end of slice. However, the search width will generally not drop below two macroblocks.

When performing motion estimation on the first macroblock of a slice, the search area may be smaller than the full search area, and is generally, half the full search area. At the motion estimation of the second macroblock of the slice, generally the start pointer does not increment and the search width parameter increments by one, such that the search area of the second macroblock "expands" with respect to the previous search area. On subsequent motion estimations, the start pointer may remain unchanged and the search width parameter may increment by one until the search area has expanded to the full size. Thereafter it resumes normal mode motion estimation, where the start pointer increments by one while search width parameter remains constant at subsequent motion estimations. For a thick mode cache where there are two search areas, search area width reduction takes place independently for each search area.

An embodiment of the present invention provides an efficient and simple method to minimize the overall cache size to support one wide search area or two smaller search areas using a single addressing mechanism for motion estimation processes. The method also enables flexible memory access bandwidth control when performing motion estimations across slices without sacrificing video quality, or increasing processing time or complexity, thereby eliminating the need to double-buffer the cache or increase memory bandwidth at start of slices for search area preloading.

The method also supports general global motion vector offset of the search window.

BRIEF DESCRIPTION OF THE SEVERAL VIEWS OF THE DRAWINGS

For a better understanding of the present invention and to understand how the same may be brought into effect, the invention will now be described by way of example only, with reference to the appended drawings in which:

FIGS. 7a–k show another series of motion estimations across a slice with one GMV pointing out of the reference frame for reference macroblocks near the end of the slice.

DETAILED DESCRIPTION OF THE PREFERRED EMBODIMENTS

Figure 1:
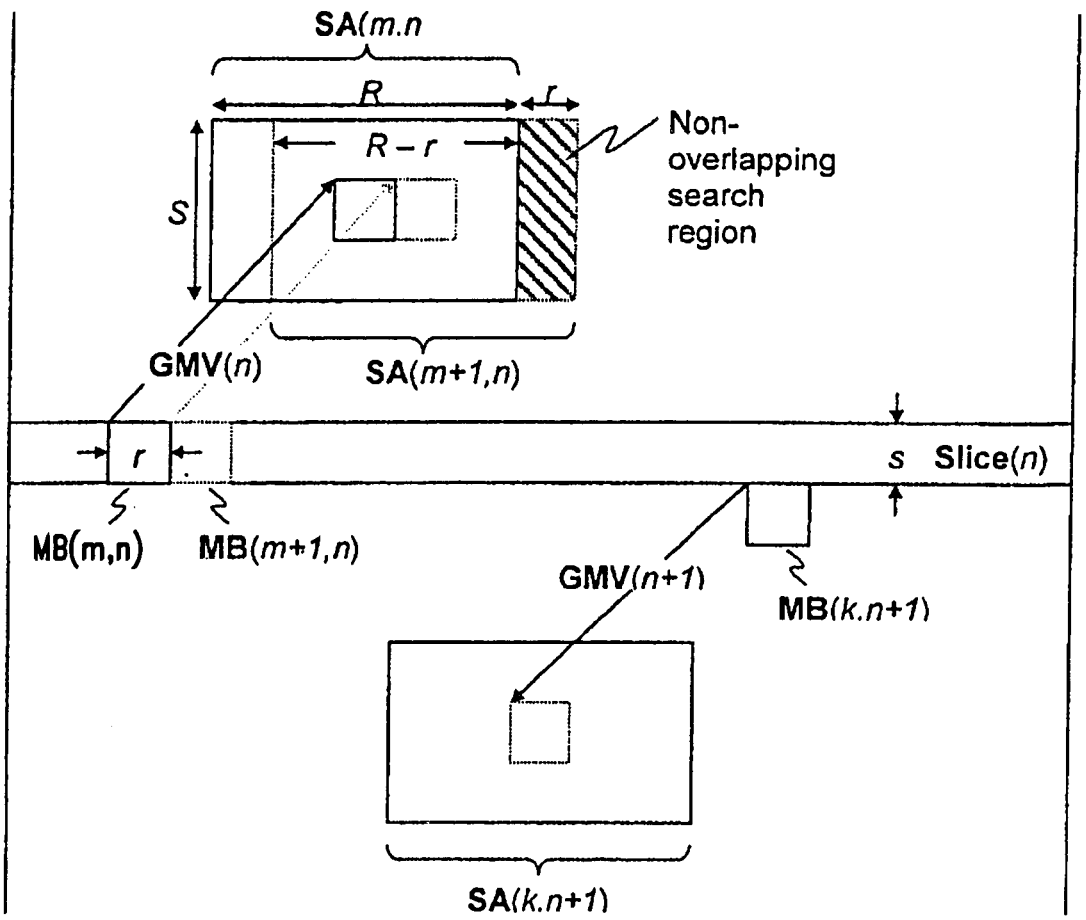
FIG. 1 shows a slice of a current frame with reference macroblocks and associated GMV and search areas, and sequential relation of search areas of adjacent reference macroblocks in the same slice.

FIG. 1 shows an example of a reference macroblock and its associated search area. This illustration forms the basis for describing embodiments of the present invention. The macroblock MB(m,n) is a matrix of r×s pixels in the current frame, where index m designates the macroblock number in the current slice and index n designates the slice number in the current frame. The search area SA(m,n) is a matrix of R×S pixels in a reference frame, where m and n correspond to the reference macroblock concerned. The location of the search area relative to the location of the reference macroblock is given by the global motion vector GMV(n). All reference macroblocks in the same slice have the same GMV. Also shown in FIG. 1 is reference macroblock MB(m+1,n) and its associated search area SA(m+1,n). The non-overlapping search area region between adjacent reference macroblocks in the same slice is r×S pixels, and the common search region is (R−r)×S pixels. Also shown in FIG. 1 is a reference macroblock MB(k,n+1) from adjacent slice n+1 with a different GMV. For the sake of simplifying the description of embodiments of the present invention, hereinafter R and S are taken to be integer multiple of r and s respectively, and all description of the search area dimension is normalized to the macroblock dimension. However, the invention is not limited to situations in which R and S are integer multiples of ra nd s. Also, a frame consists of N slices, with M macroblocks in each slice.

Figure 2A:
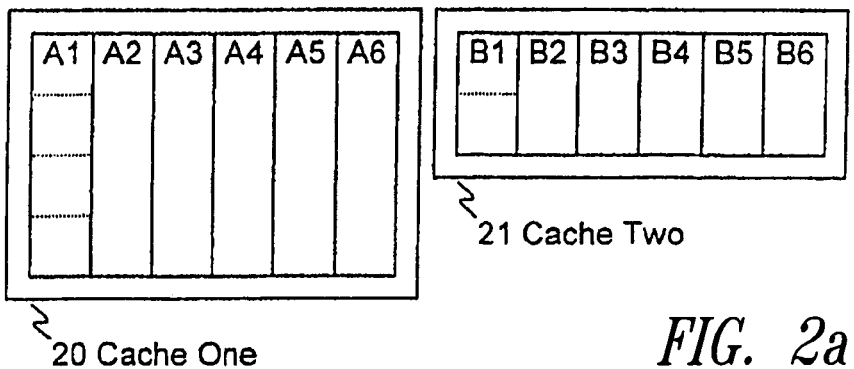
FIGS. 2a–c show an embodiment of the present invention supporting a wide search area of nine by four macroblocks, or two smaller search areas of maximum six by three macroblocks each.
Figure 2B:
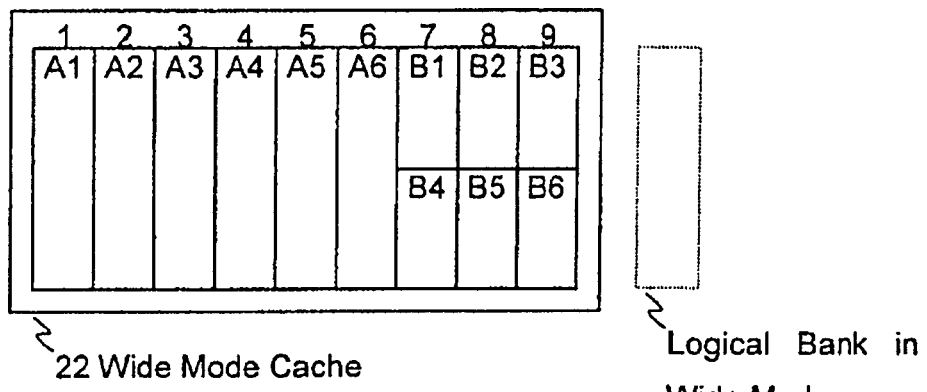
Figure 2C:
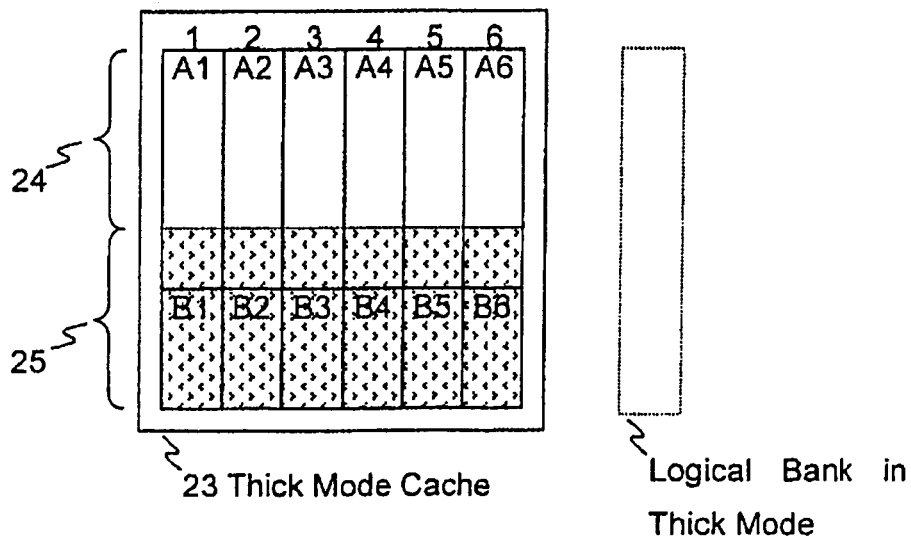

An embodiment of the present invention, shown in FIGS. 2a–2c, supports a wide search area of 9×4 macroblocks, or two smaller search areas of 6×3 macroblocks, all inclusive of the update area of one macroblock width. FIG. 2a shows the configuration of cache one 20 and cache two 21. Cache one 20 has six banks of memory, each of one macroblock width and four macroblocks height. Cache two 21 has six banks of memory, each of one macroblock width and two macroblocks height. FIG. 2b shows the bank configuration of cache one 20 and two 21 in wide cache mode. The wide mode cache 22 has nine logical banks of memory, each of one macroblock width and four macroblock height. Logical banks 1 to 6 are each made up of one memory bank from cache one 20. Logical bank 7 to 9 are each made up of two memory banks from cache two 21 concatenated vertically.

FIG. 2C shows the bank configuration of cache one 20 and two 21 in thick cache mode. The thick mode cache 23 has six logical banks of memory, each of one macroblock width and six macroblock height. Each logical memory bank has one memory bank from cache one 20 and one memory bank from cache two 21 concatenated vertically. The thick mode cache 23 is partitioned into two portions, the upper 24 and lower 25 portion each storing one search area. In both wide and thick mode, the cache is 100% utilized.

Figure 3A:
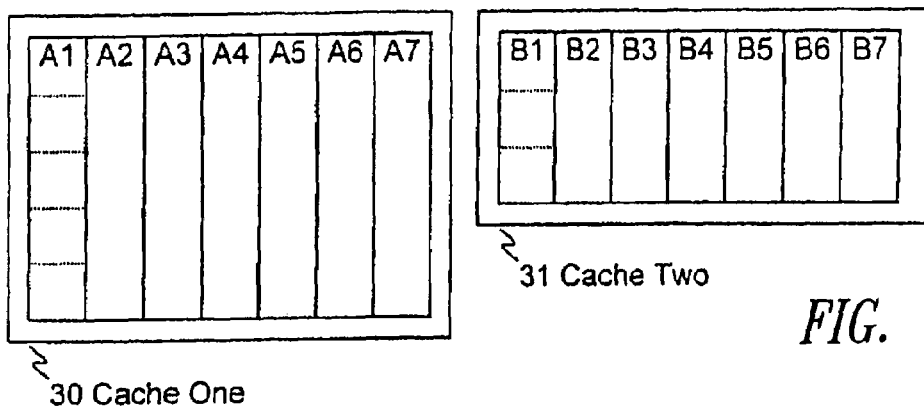
FIGS. 3a–c show an embodiment of the present invention supporting a wide search area of ten by five macroblocks, or two smaller search areas of maximum seven by four macroblocks each.
Figure 3B:
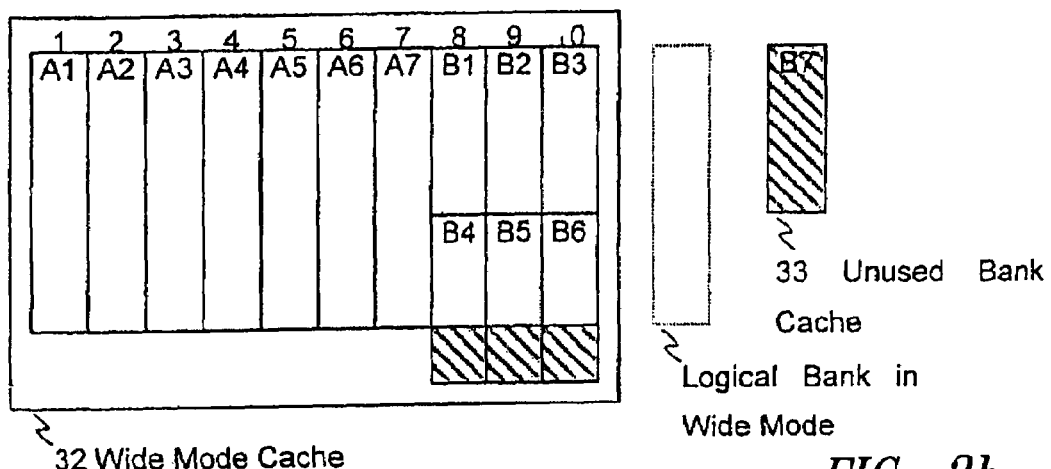
Figure 3C:
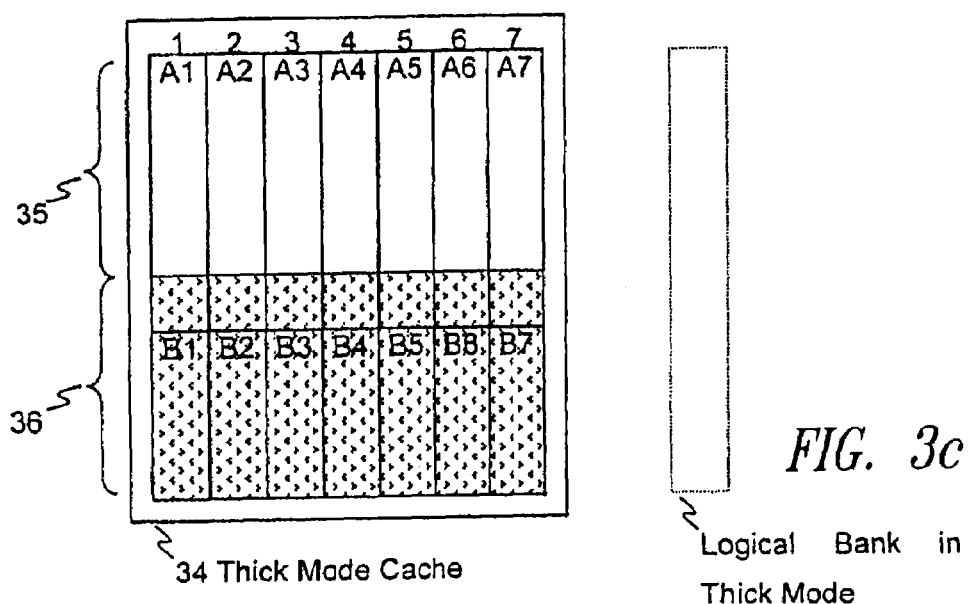

Another embodiment, shown in FIGS. 3a–3c, supports a wide search area of 10×5 macroblocks, or two smaller search areas of 7×4 macroblocks, all inclusive of the update area of one macroblock width. FIG. 3A shows the configuration of cache one 30 and cache two 31. Cache one 30 has seven banks of memory, each of one macroblock width and five macroblocks height. Cache two 31 has seven banks of memory, each of one macroblock width and three macroblocks height. FIG. 3B shows the bank configuration of cache one 30 and two 31 in wide cache mode. The wide mode cache 32 has ten logical banks of memory, each of one macroblock width and five macroblock height. Logical bank 1 to 7 are each made up of one memory bank from cache one 30. Logical bank 8 to 10 are each made up of two memory banks from cache two 31 concatenated vertically. Since (w>2×(W−w)), where w is the smaller search area width and W is the wide search area width, both mentioned earlier, there is (w−2(W−w))=(7−2(10−7))=1 unused bank 33 from cache two 31. FIG. 3C shows the bank configuration of cache one 30 and two 31 in thick cache mode. The thick mode cache 34 has seven logical banks of memory, each of one macroblock width and eight macroblock height. Each logical memory bank has one memory bank from cache one 30 and one memory bank from cache two 31 concatenated vertically. The thick mode cache 34 is partitioned into two portions, the upper 35 and lower 36 portion each storing one search area. Since (W≦3w/2) and (H≦4h/3), the cache is 100% utilized under thick mode but not under wide mode.

Figure 4A:
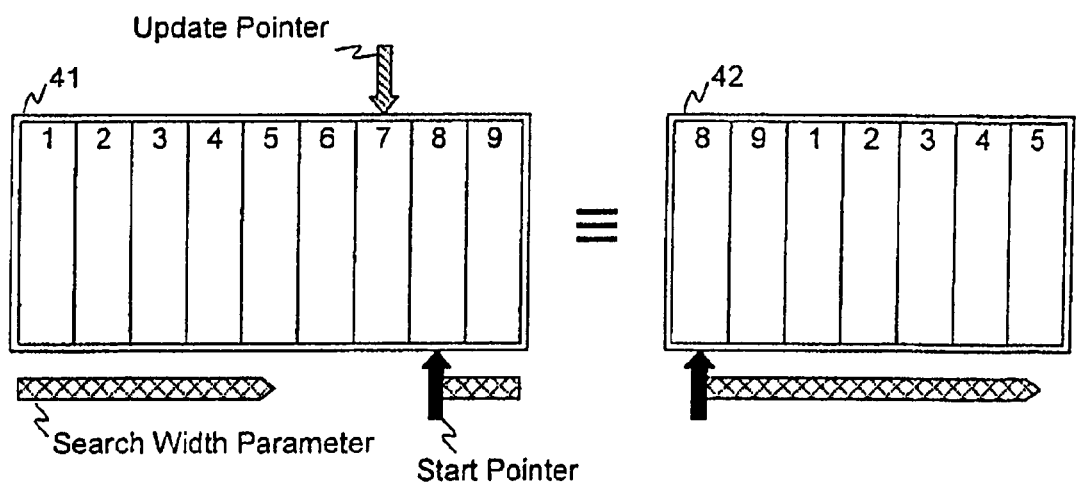
FIGS. 4a and b show a means of controlling an embodiment of the present invention in wide and thick mode.
Figure 4B:
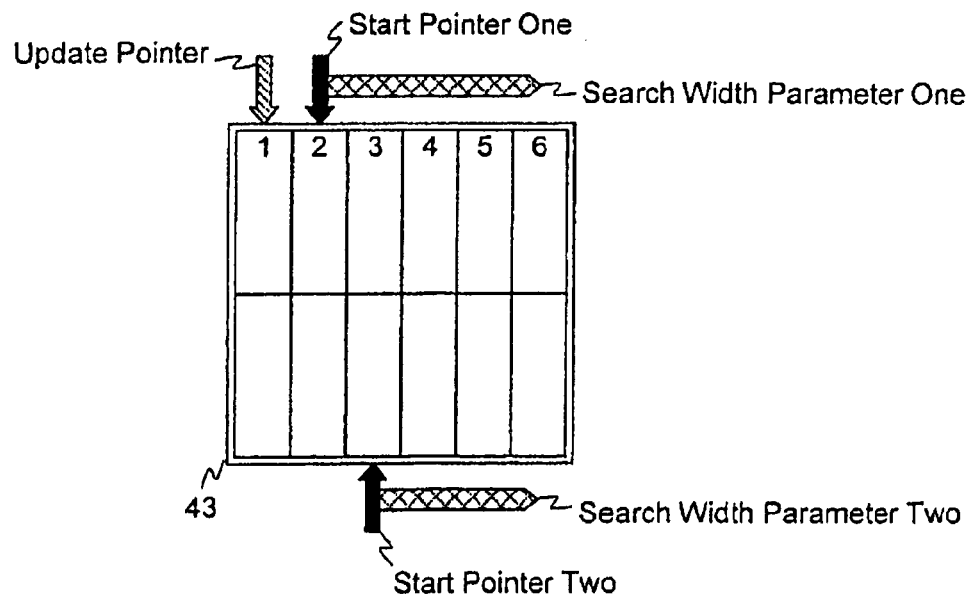
Figure 5A:
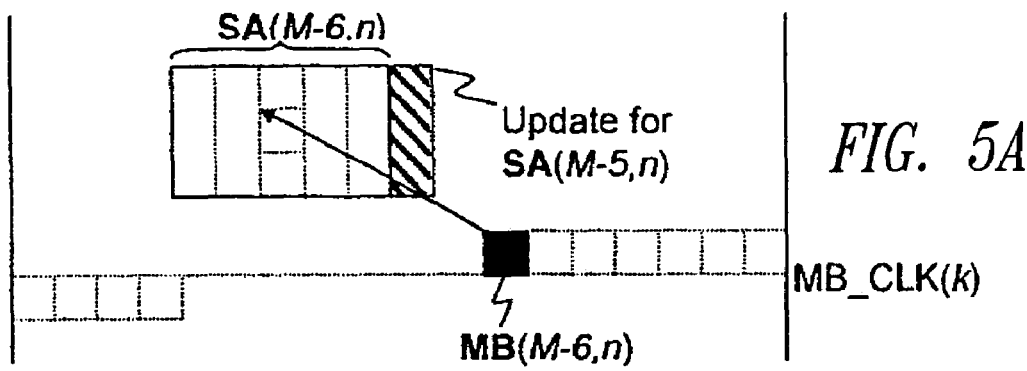
FIGS. 5a–k show a series of motion estimations across a slice with GMV always pointing within the reference frame.
Figure 5B:
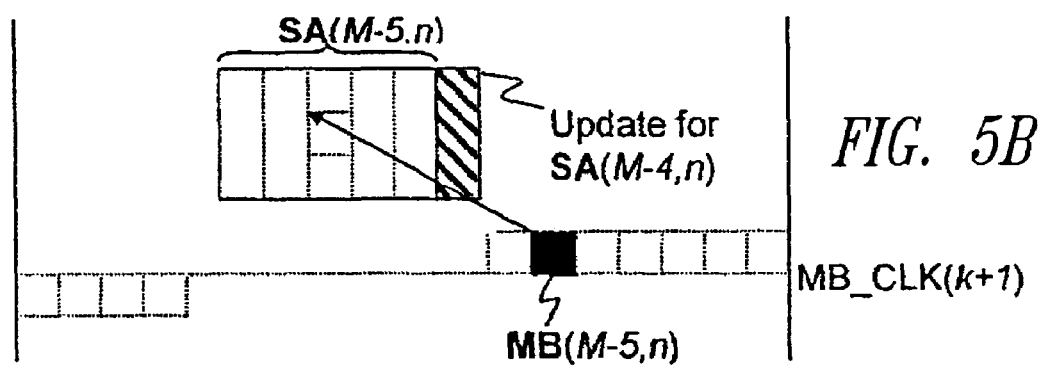
Figure 5C:
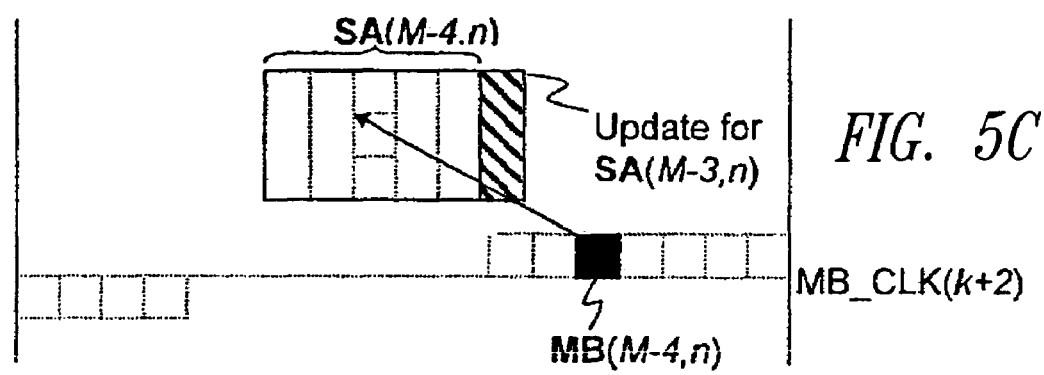
Figure 5D:
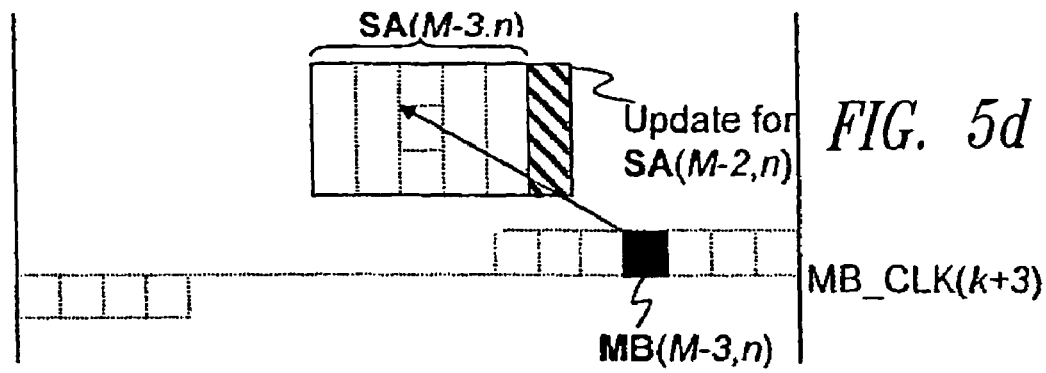
Figure 5E:
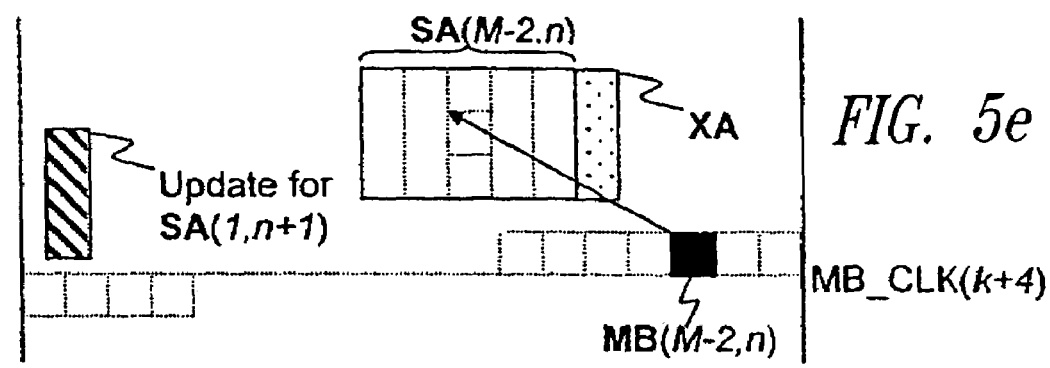
Figure 5F:
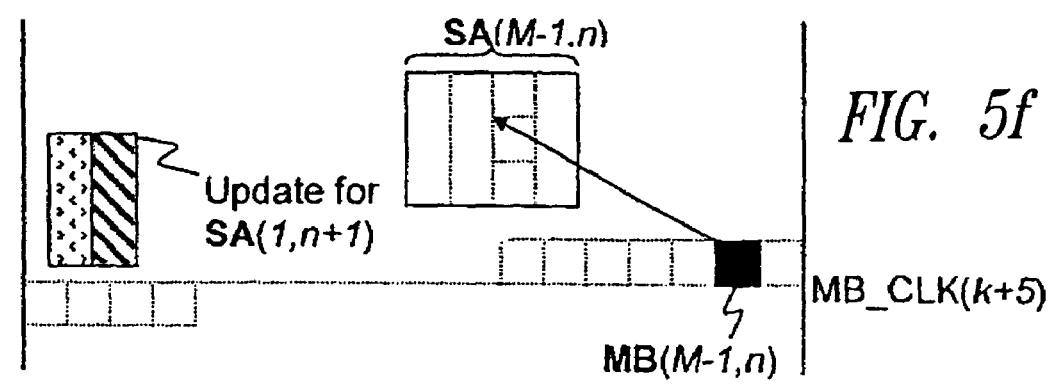
Figure 5G:
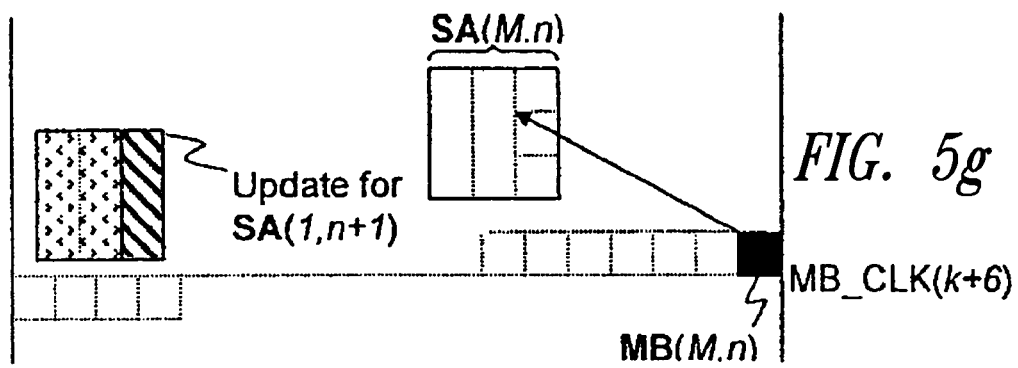
Figure 5H:
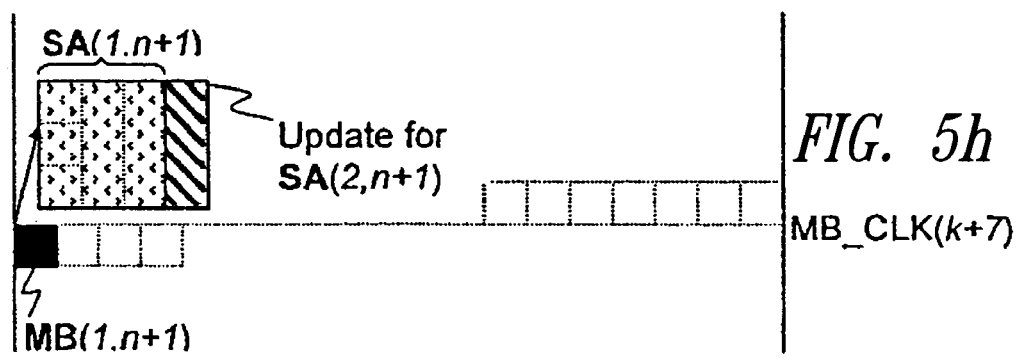
Figure 5I:
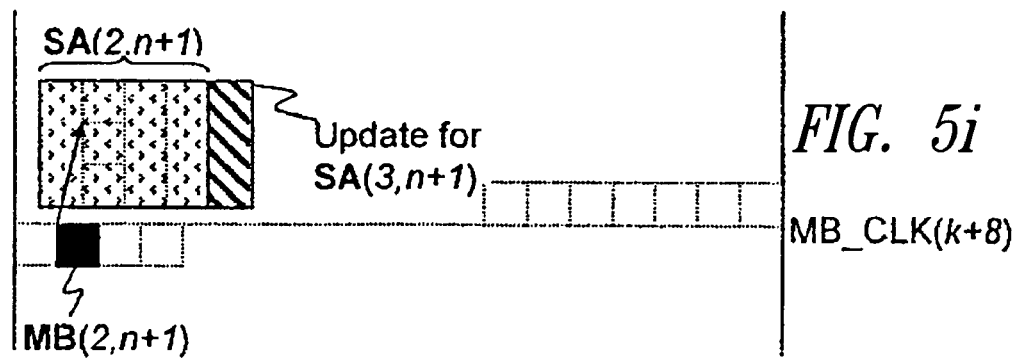
Figure 5J:
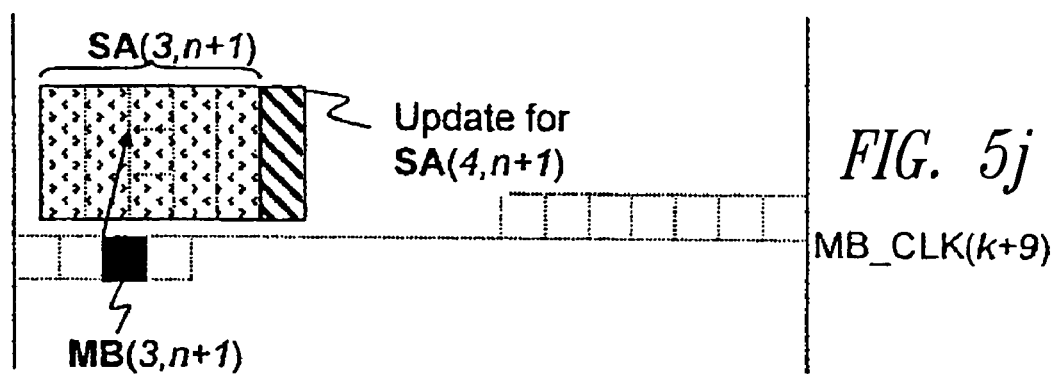
Figure 5K:
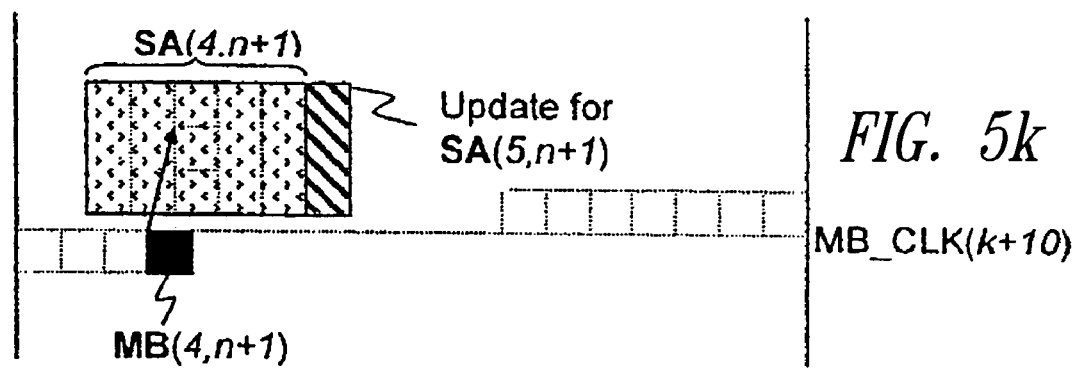
Figure 6A:
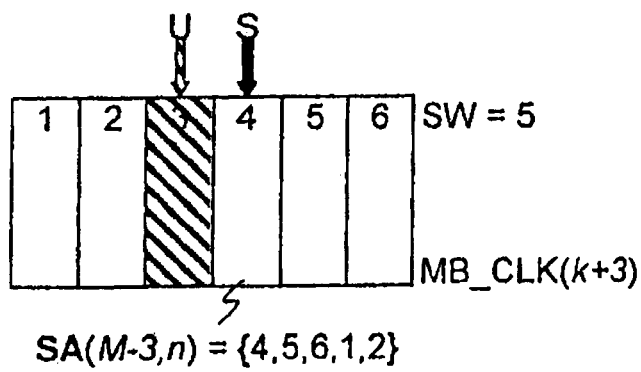
FIGS. 6a–h show the cache activities supporting one search area for part of the series of motion estimations shown in FIG. 5.
Figure 6B:
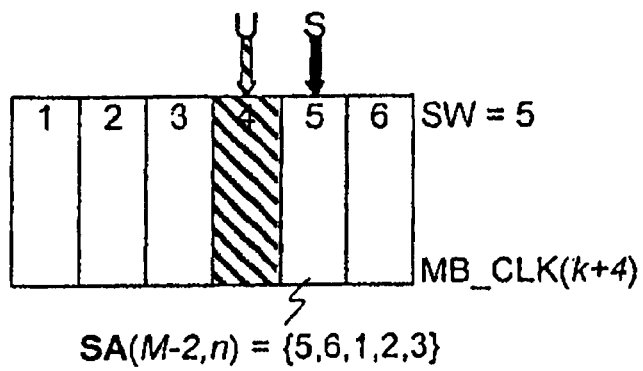
Figure 6C:
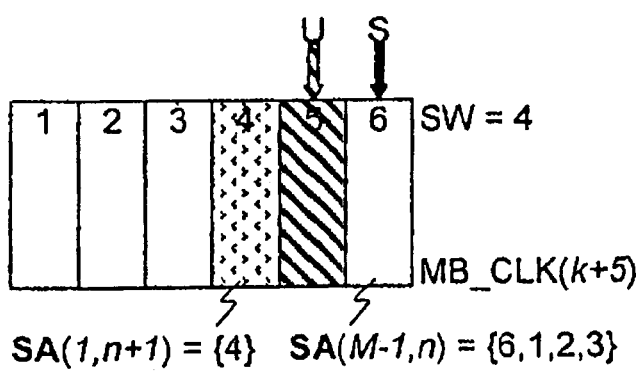
Figure 6D:
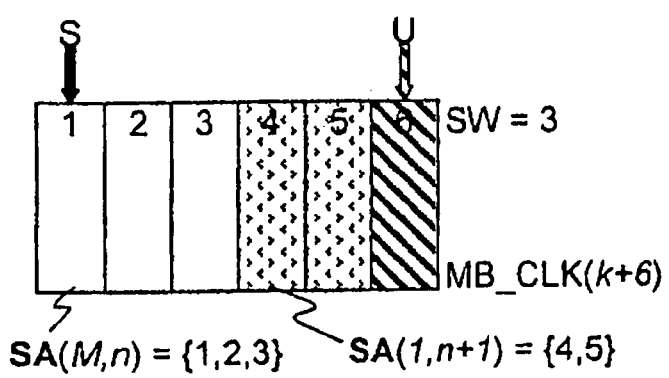
Figure 6E:
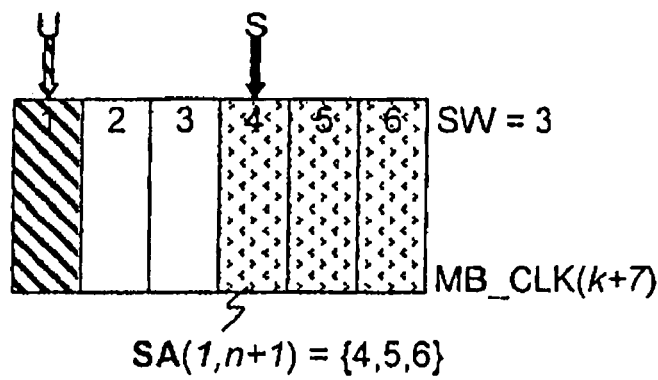
Figure 6F:
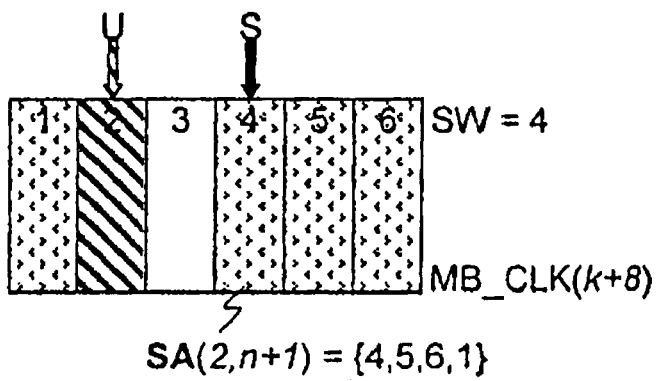
Figure 6G:
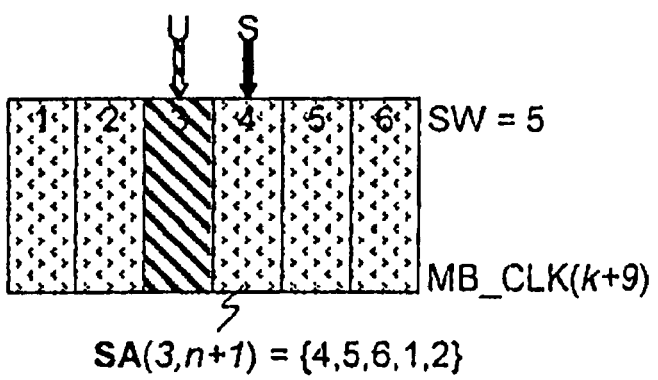
Figure 6H:
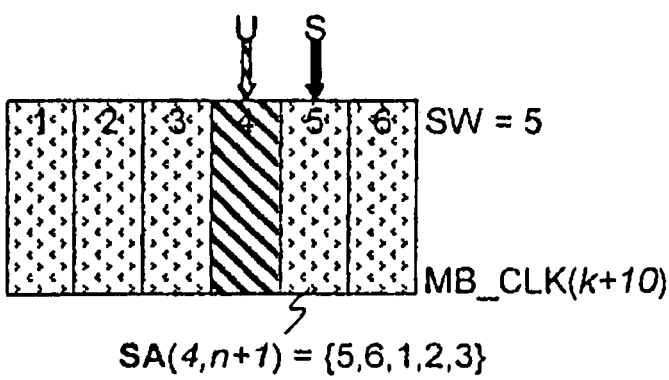
Figure 7A:
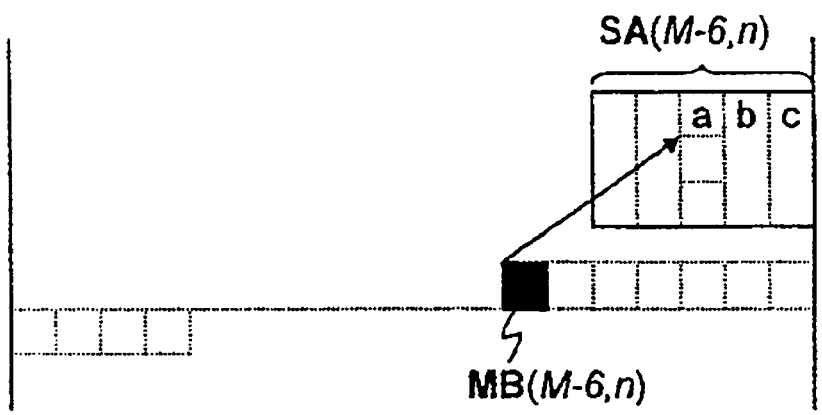
Figure 7B:
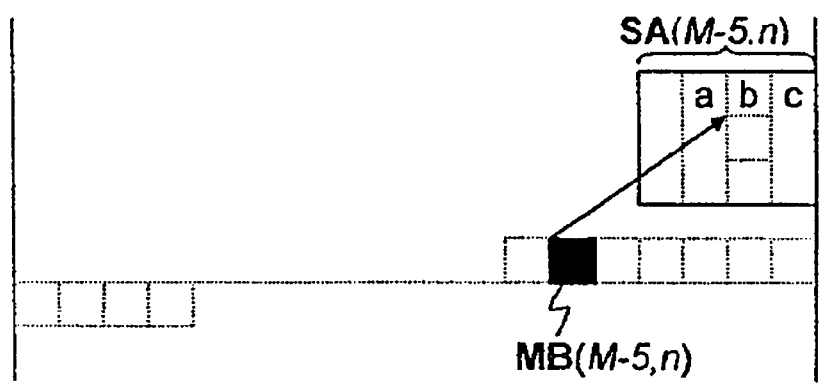
Figure 7C:
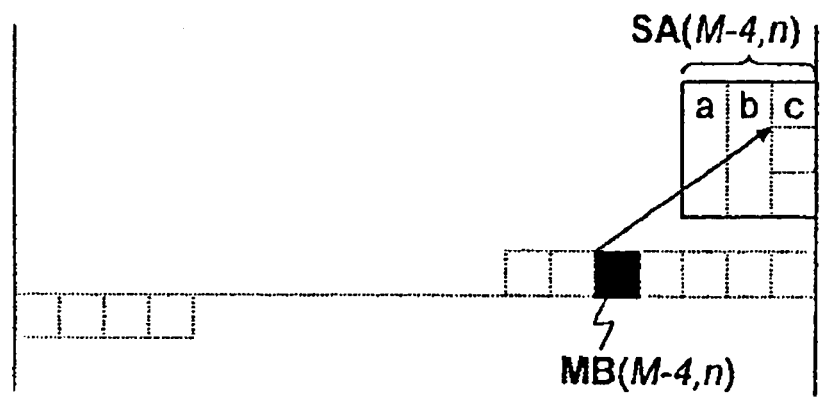
Figures 7D, 7E, 7F:
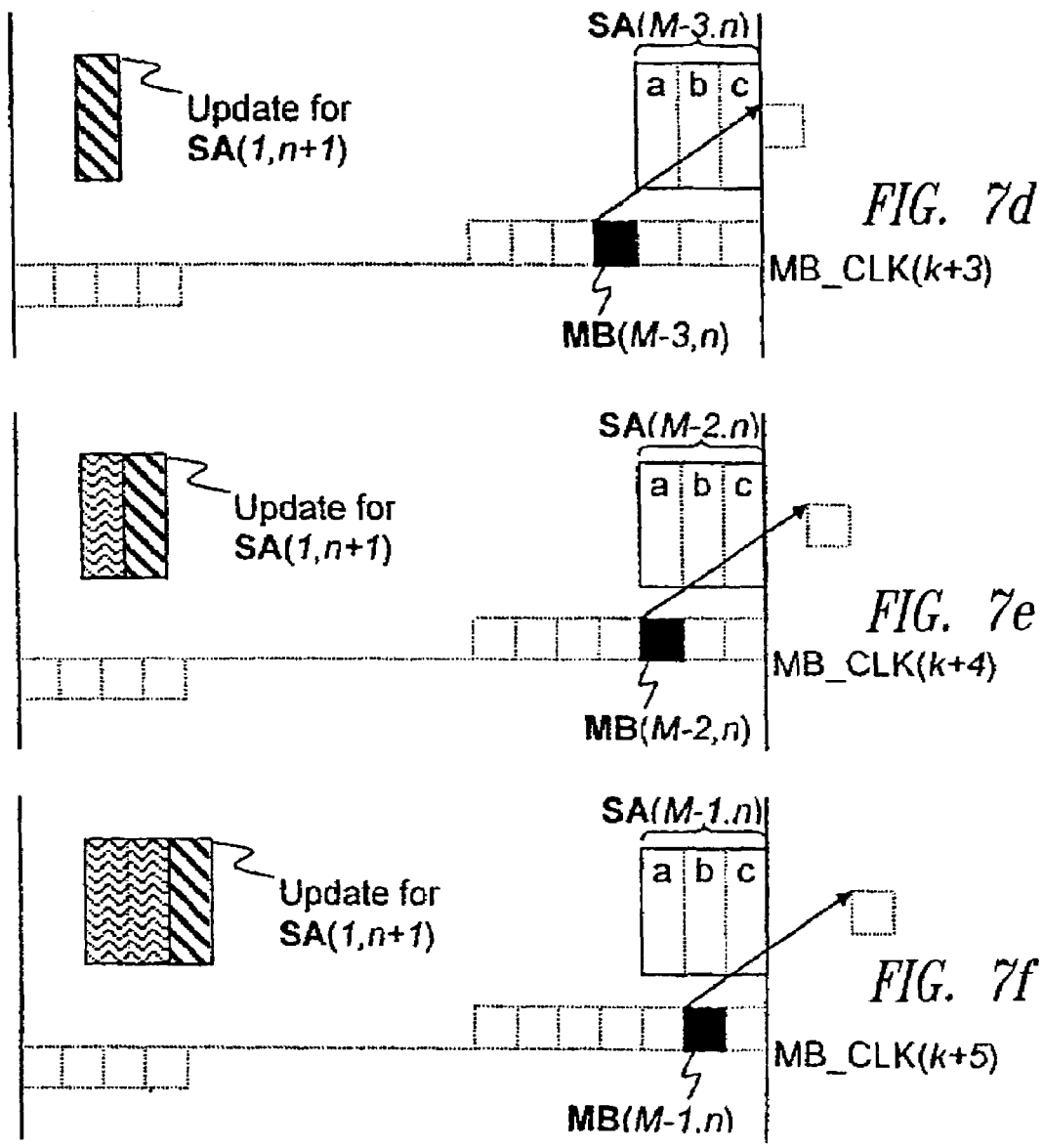
Figure 7J:
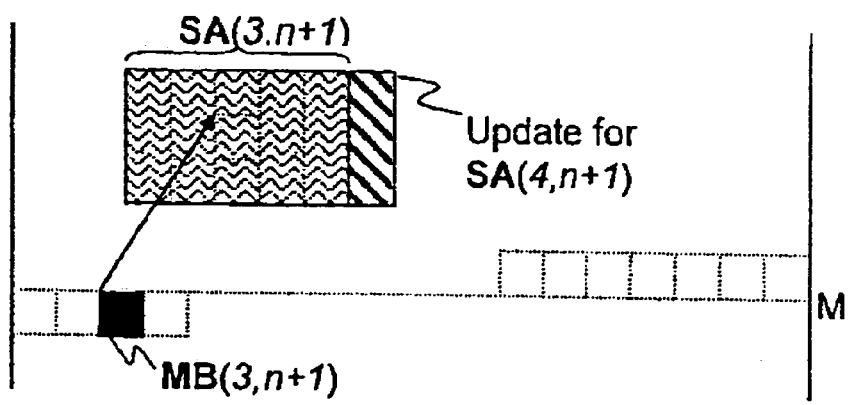
Figure 7K:
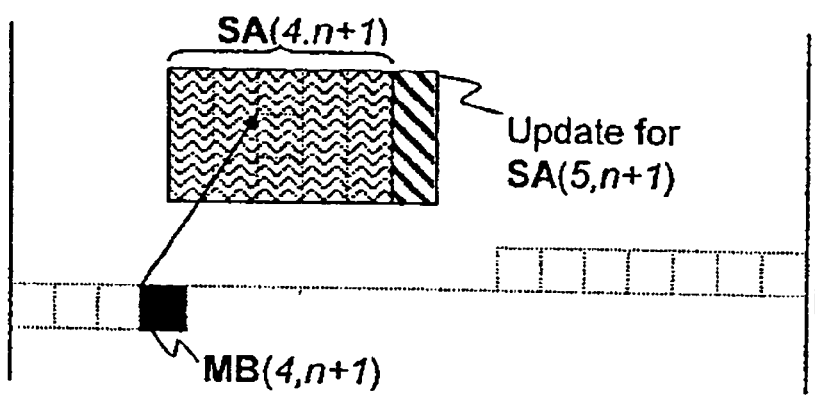
Figure 8A:
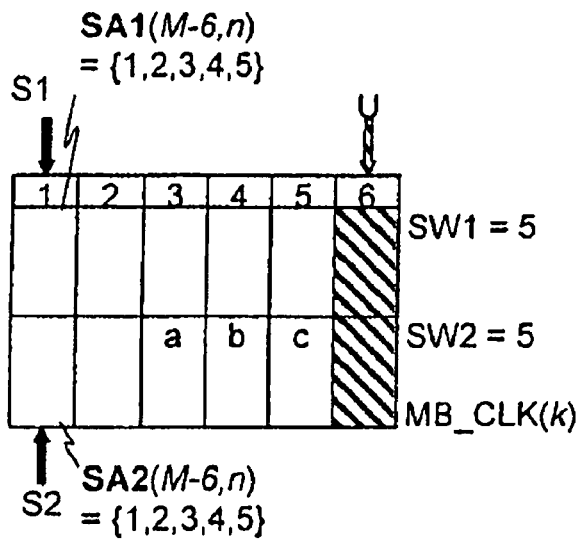
FIGS. 8a–8k show the activities of a thick mode cache supporting two search areas for the two series of motion estimations associated with FIG. 5 and FIG. 6.
Figure 8B:
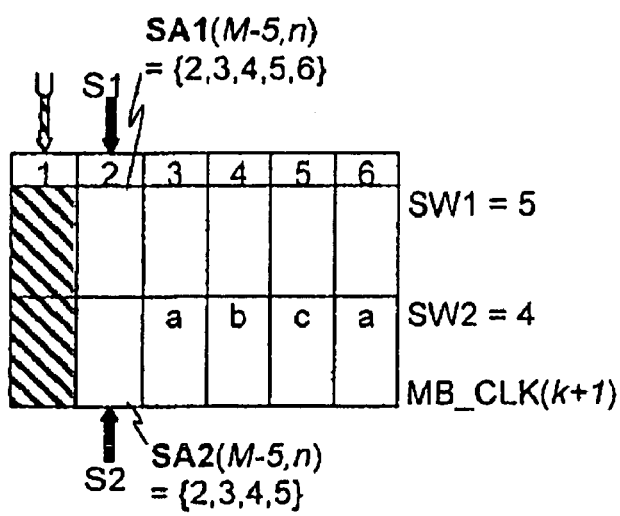
Figure 8C:
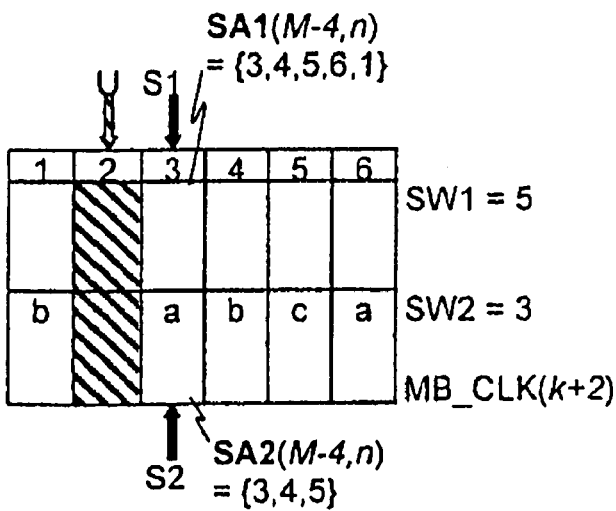
Figure 8D:
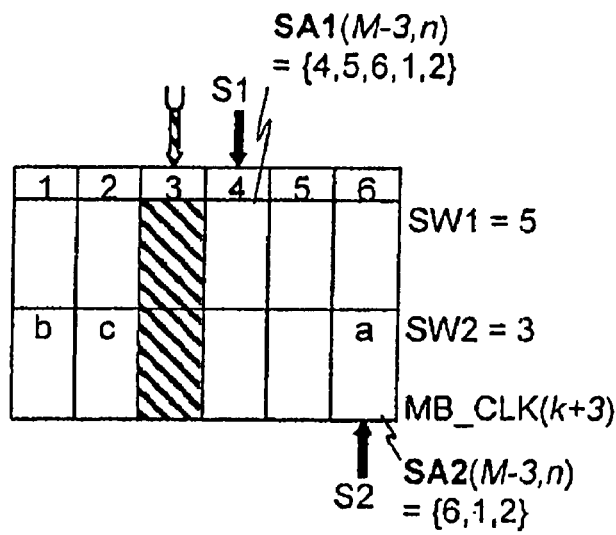
Figure 8E:
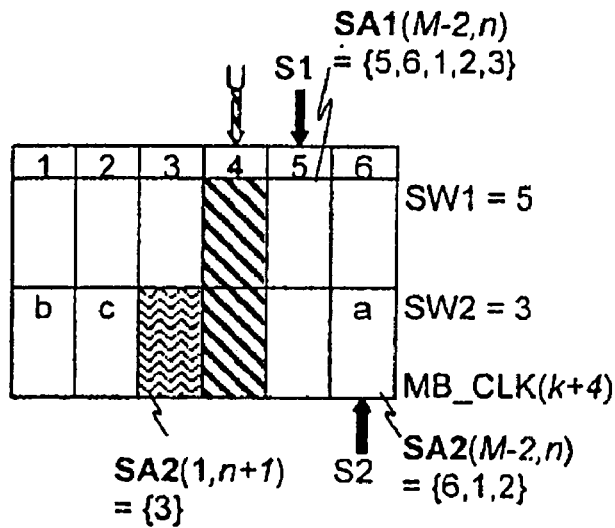
Figure 8F:
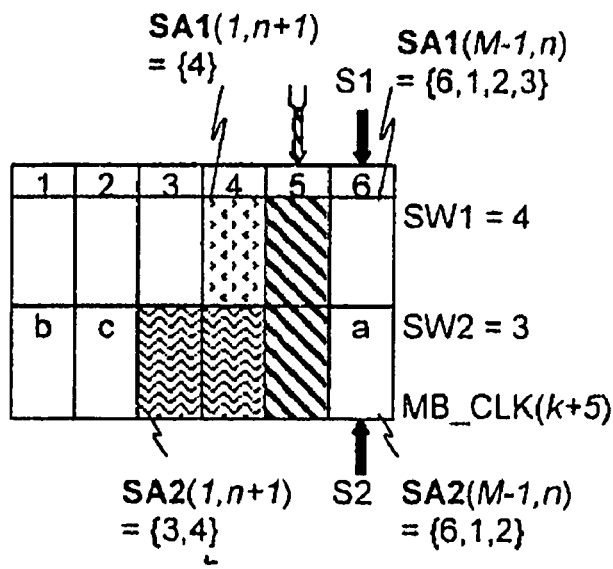
Figure 8G:
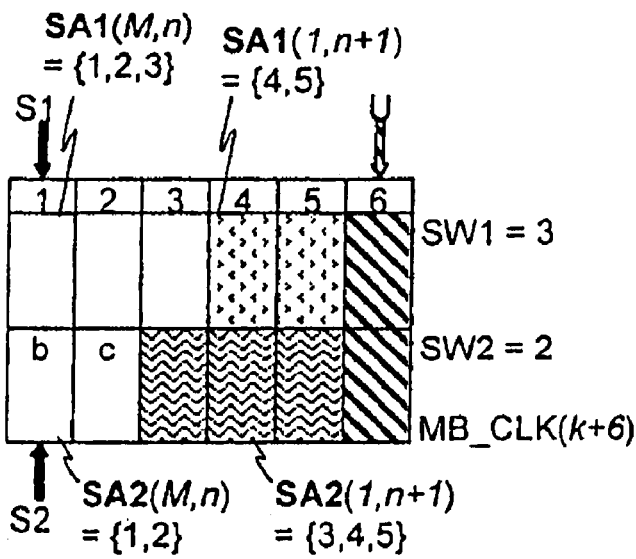
Figure 8H:
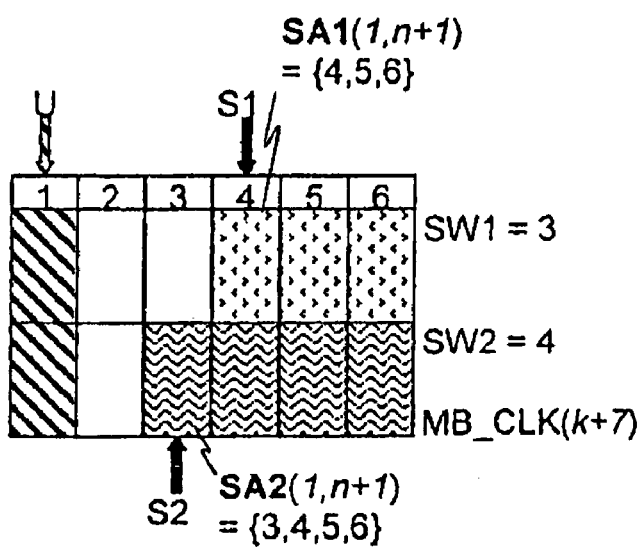
Figure 8I:
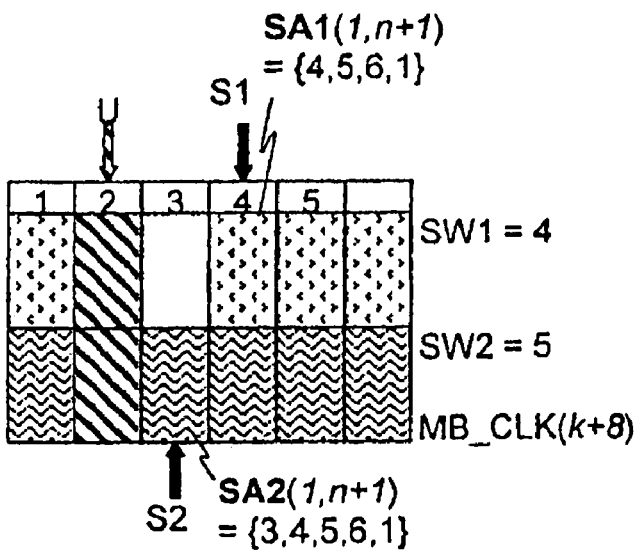
Figure 8J:
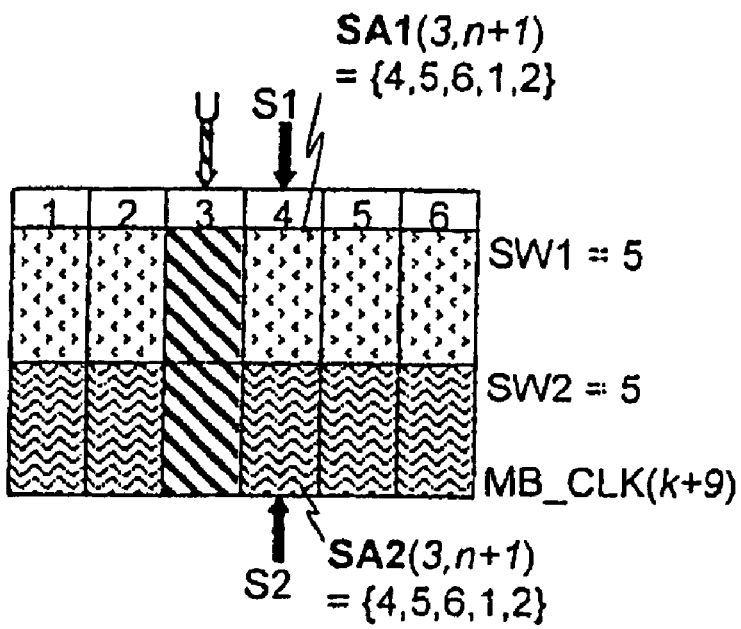
Figure 8K:
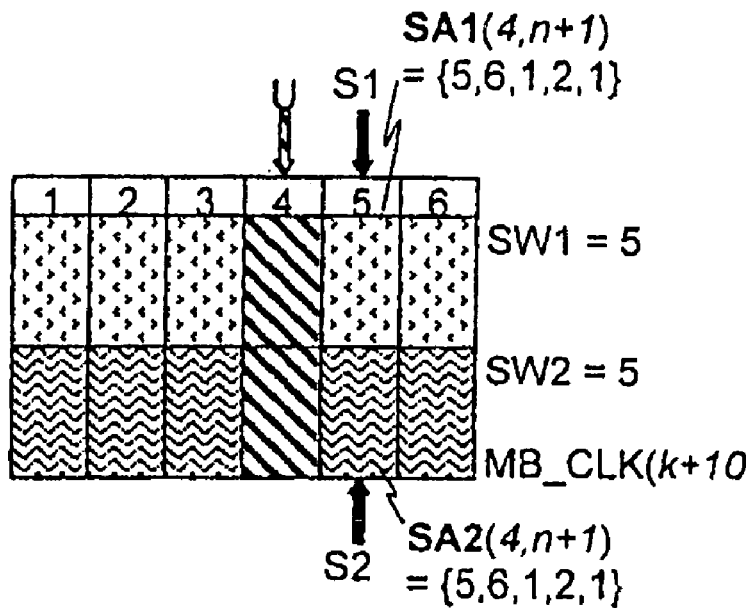

FIG. 4 shows an example embodiment illustrating the apparatus and means to manage the configured logical caches. FIG. 4A shows a wide mode cache 41 with the update pointer, start pointer and search width parameter. Since the cache functions in a circular manner, the search area 42 is contained by logical bank 8, 9, 1, 2, 3, 4 and 5 in that order, with the current update bank being logical bank 7. FIG. 4B shows a thick mode cache 43 with the update pointer, start pointer one and search width parameter one for search area one, and start pointer two and search width parameter two for search area two. The addressing of the pointers and parameter calculations to be achieved for implementing the invention can, for example, be performed in a state machine.

In an example embodiment of the invention represented by a series of motion estimations illustrated in FIGS. 5a–5k and FIGS. 6a–6h, a configured cache of six logical banks is used for storing the search areas. MB_CLK is the processing time for motion estimation of one reference macroblock, where the index k gives the "clock-tick" of MB_CLK. FIGS. 5a–5k show eleven "snap-shots" from MB_CLK(k) to MB_CLK(k+10) showing, at each instant, the current reference macroblock in the current frame, its GMV and search area in the reference frame (the reference frame is shown superimposed on the current frame), the current content loading to cache, and the current content stored in cache. FIGS. 6a–6h show eight snap-shots from MB_CLK(k+3) to MB_CLK(k+10) showing, at each instant, the position of update pointer (U) and start pointer (S), the value of search width parameter (SW), and the content each bank is storing.

MB_CLK(k) to MB_CLK(k+3) show normal mode motion estimation, where the maximum search area (of five macroblock columns) is used, and the start pointer increments by one at each new MB_CLK while maintaining the same value for the search width parameter, and the cache is updated with a macroblock column sequentially adjacent to the current search area (the non-overlapping region of the next search area). At MB_CLK(k+3), the update pointer is at bank 3, the start pointer at is bank 4 and the search width is set to 5 banks. Search area SA(M−3,n) of five macroblock columns is stored in banks {4,5,6,1,2} respectively. The rightmost macroblock column of SA(M−2,n) is loaded to bank 3. At MB_CLK(k+4), search area width reduction mode starts. Although motion estimation is still performed on the full search area and both pointers increment by one, the update bank is loaded with the leftmost macroblock column (or first column) of SA(1,n+1), instead of loading the macroblock column sequentially adjacent to the current search area SA(M−2,n) indicated by XA in FIG. 5.

At MB_CLK(k+5) both pointers increment by one and the search width parameter decrements by one. SA(M−1,n) consists of only four macroblock columns instead of a full five columns. The update bank, now at bank 5, stores the second macroblock column of SA(1,n+1). At MB_CLK(k+6), showing motion estimation for the last reference macroblock of the current slice, both pointers increment by one. Since the pointers increment in a mod-six (since there are six logical banks) manner, the start pointer is now "wrapped" around to point at bank 1. The search width is further reduced by one, while the third macroblock column of SA(1,n+1) is loaded to bank 6.

At MB_CLK(k+7), showing motion estimation of the first reference macroblock of the next slice, the start pointer jumps by three to point at bank 4, the bank that contains the leftmost macroblock column of current search area SA(1, n+1). The search area is three macroblock columns. At the same time, bank 1 is updated with the macroblock column sequentially adjacent to SA(1,n+1), which is also the fourth macroblock column of SA(2,n+1). At MB_CLK(k+8), the search width increments to four. The start pointer does not increment since the leftmost macroblock column of SA(2, n+1) is still at bank 4. Bank 2 is loaded with the fifth macroblock column of SA(3,n+1), which is sequentially adjacent to SA(2,n+1). At MB_CLK(k+9) motion estimation resumes normal mode. The search area is now at full width. The start pointer still does not increment since the leftmost macroblock column of SA(3,n+1) is at bank 4. Bank 3 is loaded with the macroblock column sequentially adjacent to SA(3,n+1), constituting the rightmost macroblock column of the next search area.

Hereafter, motion estimations are performed in normal mode, while at subsequent MB_CLK increments, the cache is updated with a macroblock column sequentially adjacent to the current search area which constitutes the rightmost macroblock column of the next search area, and motion estimation is performed on the full search area, and the pointers increment by one at every MB_CLK, until near the end of current slice where search area width reduction takes place again.

Another embodiment of the invention, involving two series of motion estimations on a current frame, is illustrated by FIGS. 7a–7k in conjunction with FIGS. 5a–5k. FIGS. 7a–7k and FIGS. 8a–8k show the snap-shots of a second series of motion estimations (hereinafter referred to as ME2) conducted in parallel with the first series of motion estimations (hereinafter referred to as ME1) previously described using FIGS. 5a–5k and FIGS. 6a–6h. Typically, ME2 may use the same reference frame as ME1 for its search areas, or may use a different reference frame. Generally, for the first case, ME1 and ME2 are estimating for foreground/background motions, and for the second case, ME1 and ME2 are estimating for forward/backward motions. FIGS. 7a–7k show a number of reference macroblocks near the end of a slice having a GMV that points out of the reference frame such that part or all of the search areas are out of the reference frame. In this example, when the GMV points out of the reference frame, the search area used for motion estimation is the three macroblock columns sequentially nearest to the GMV, except for the last motion estimation of the slice where two macroblock columns are used. FIGS. 8a–8k show a thick mode cache of six logical banks supporting two search areas, with search area one for ME1 and search area two for ME2. Referencing FIGS. 5a–5k, FIGS. 7a–7k and FIGS. 8a–8k, with index k in each figure referring to the same MB_CLK instant, cache activity supporting the search areas for ME1 and ME2 is described below. The management of start pointer one (S1) and search width parameter one (SW1) for search area one is similar to that described by FIGS. 6a–6h, and is thus not described here in detail. In FIGS. 8a–8k, SA1 is the search area corresponding to FIGS. 5a–5k and SA2 is the search area corresponding to FIGS. 7a–7k. Since ME1 and ME2 are independent processes with no relationship in the search area locations, it is assumed that at every MB_CLK, the cache is updated with data, inferring that the update pointer will simply be incremented by one at every MB_CLK.

While ME1 is in normal mode from MB_CLK(k) to MB_CLK(k+3) and starts search area width reduction at MB_CLK(k+4) to cater for preloading of SA1(1,n+1), ME2 ends normal mode operation at MB_CLK(k−1) (not shown in the figures) and starts search area width reduction at MB_CLK(k) but not for preloading of SA2(1,n+1). The preloading of SA2(1,n+1) starts at MB_CLK(k+3). From MB_CLK(k+1) until the end of the slice at MB_CLK(k+6), the search areas are either partially or completely out of the reference frame. From MS_CLK(k+1) to MB_CLK(k+2), the search areas are reduced for this reason. From MB_GLK(k+3) to MB_CLK(k+6), the search areas are also reduced for this reason because of the preloading for SA2(1,n+1).

At MB_CLK(k), since there is no sequentially adjacent macroblock column to SA2(M−6,n) available in the reference frame, and subsequent ME2 till the end of slice will be involving macroblock columns indicated by {a, b, c}, with the fact that update pointer increments by one at every MB_CLK and search area cannot include the update bank, macroblock column {a} is reloaded to cache at the lower portion of bank 6. At MB_CLK(k+1), search width parameter two (SW2) is reduced by one and start pointer two (S2) increments by one. Macroblock column {b} is reloaded to cache at bank 1. ME2 is now on a reduced search area of four macroblock columns. At MB_CLK(k+2), search width parameter two is further reduced by one and start pointers two incremented to point at bank 3. Macroblock column {c} is reload to cache at bank 2 at this instant. ME2 is now on a reduced search area of three macroblock columns.

At MB_CLK(k+3), start pointer two jumps by three to bank 6, with search width parameter two remaining at three. Reloading of macroblock columns {a,b,c} thus occurs because the search area should not contain the update bank. Now preloading for SA2(1,n+1) starts and lower portion of bank 3 is loaded with the first macroblock column of SA2(1,n+1). At MS_CLK(k+4), start pointer two remains at bank 6 and search width parameter two remains at three. The second macroblock column of SA2(1,n+1) is updated to bank 4. At MB_CLK(k+5), start pointer two remains at bank 6 and search width parameter two remains at three. The third macroblock column of SA2(1,n+1) is updated to bank 5. At MB_CLK(k+6), motion estimating for the last reference macroblock of the current slice, start pointer two increments by one to bank 1 while search width parameter two reduces by one. Search area is now two macroblock columns. Bank 6 is loaded with the fourth macroblock column of SA2(1, n+1).

At MB_CLK(k+7), motion estimating for the first reference macroblock of the slice, start pointer two jumps to point to the first macroblock column of SA2(1,n+1) at bank 3. The search area is four macroblock columns. Lower portion of bank 1 is now updated with the macroblock column sequentially adjacent to SA2(1,n+1). At MB_CLK(k+8), ME2 resumes normal mode, one MB_CLK earlier than ME1.

The above illustrative descriptions of the general applications of present invention is but just one of many ways to use the present invention under the given situations. It is also apparent to those skilled in the art that there are alternative ways to control the pointers and search width parameters for the given situations, and algorithms exist for controlling the said pointers and parameters to handle difference situations.

In an implementation of the invention adapted to an MPEG2 video encoder motion estimation circuit with a macroblock size of 16×16 pixels supporting a wide search area of ten macroblocks horizontal (including update) by five macroblocks vertical, or two smaller search areas of maximum seven macroblocks (including update) horizontal by four macroblocks vertical, single port SRAM are used for cache one and two.

As is apparent to those skilled in the art, various modifications can be made to the disclosed preferred embodiments. More particularly, the invention may be applied using other means of managing the configured cache other than the described means involving update and start pointers and search width parameters. Furthermore, while the invention is described considering simultaneous search area updating and motion estimation it is by no means limiting or restricting; it is apparent to those skilled in the art that the present invention performs equally well for non-simultaneous search area updating and motion estimation. In particular, the invention may apply to any type of process other than motion estimation, using comparators, adders, subtractors, etc., or any combination of elementary operators that support two dimensionally different 2D-matrices of elements. All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

In the light of the foregoing description, it will be clear to the skilled man that various modifications may be made within the scope of the invention.

The present invention includes a novel feature or combination of features disclosed herein either explicitly or any generalization thereof irrespective of whether or not it relates to the claimed invention or mitigates any or all of the problems addressed.

We claim:

1. A cache memory system for use in a motion estimation system, comprising:
   a first cache memory defined in terms of a first width and a first height, and a second cache memory defined in terms of a second width and a second height, wherein said second height is less than said first height;
   the cache memory system being structured in one of two arrangements:
   a first arrangement having banks of memory from the second cache memory concatenated vertically such that their concatenated height is at least equal to the first height, and said concatenated banks being arranged to be appended to the width of the first cache memory to form a single contiguous address space, and a second arrangement having banks of memory from the first and second caches stacked vertically, and arranged to be addressed as two separate address spaces.

2. A cache memory system as claimed in claim 1 wherein the first and second widths are equal.

3. A cache memory system as claimed in claim 1 wherein the first arrangement is for use with a motion estimation system having a single search area.

4. A cache memory system as claimed in claim 1 wherein the second arrangement is for use with a motion estimation system having two separate search areas.

5. A cache memory system as claimed in claim 4 wherein the two separate search areas are of equal size.

6. A cache memory system as claimed in claim 1 wherein in the second arrangement, each bank of the first cache memory is stacked with a corresponding one of the banks of the second cache memory, thereby forming a set of logical banks that each include one bank of the first cache memory and the corresponding bank of the second cache memory.

7. A cache memory system as claimed in claim 6 wherein in the second arrangement, the two separate address spaces are first and second address spaces, the first address space including first portions of each of the banks of the first cache memory and the second address space including the banks of the second cache memory and second portions of each of the banks of the first cache memory.

8. A motion estimation system, comprising a cache memory system that includes:

a first cache memory defined in terms of a first width and a first height, and a second cache memory defined in terms of a second width and a second height, wherein said second height is less than said first height;

the cache memory system being structured in one of two arrangements:

a first arrangement having banks of memory from the second cache memory concatenated vertically such that their concatenated height is at least equal to the first height, and said concatenated banks being arranged to be appended to the width of the first cache memory to form a single contiguous address space, and a second arrangement having banks of memory from the first and second caches stacked vertically, and arranged to be addressed as two separate address spaces.

9. A motion estimation system according to claim 8 wherein the motion estimation system is operable according an MPEG standard.

10. A motion estimation system as claimed in claim 8 wherein the cache memory system is arranged to be addressed as a circular buffer.

11. A motion estimation system as claimed in claim 8 including means for addressing the cache memory system including:

a start pointer for indicating the start of a search area;
an update pointer for indicating a bank being updated; and
a search width parameter for indicating the extent of the search area.

12. A motion estimation system according to claim 8 wherein in the second arrangement, each bank of the first cache memory is stacked with a corresponding one of the banks of the second cache memory, thereby forming a set of logical banks that each include one bank of the first cache memory and the corresponding bank of the second cache memory.

13. A motion estimation system according to claim 12 wherein in the second arrangement, the two separate address spaces are first and second address spaces, the first address space including first portions of each of the banks of the first cache memory and the second address space including the banks of the second cache memory and second portions of each of the banks of the first cache memory.

14. A method of using a cache memory system in a motion estimation system, the cache memory system including a first cache memory defined in terms of a first width and a first height, and a second cache memory defined in terms of a second width and a second height, wherein said second height is less than said first height, the method comprising:

concatening memory banks of the second cache memory according to one of two arrangements:

concatenating a first one of the memory banks of the second cache vertically on a second one of the memory bank such that the concatenated banks form a single contiguous address space with the first cache memory in a first arrangement, and concatenating the memory banks of the second memory cache vertically with corresponding memory banks of the first memory cache such that the concatenated banks are arranged to be addressed as two separate address spaces in a second arrangement.

15. The method of claim 14 wherein the first and second widths are equal.

16. The method of claim 14, further comprising using the first arrangement as a single logical cache in the motion estimation system by simultaneously searching in the first and second banks of the second cache memory as a single search area.

17. The method of claim 14, further comprising using the second arrangement as first and second logical caches in the motion estimation system by searching in the memory banks of only the first cache memory as the first logical cache and searching in the memory banks of the second cache memory and in a portion of the memory banks of the first cache memory as the second logical cache.

18. The method of claim 17 wherein the searching steps are performed simultaneously.

19. The method of claim 17 wherein searching in the first logical cache includes searching for forward/backward motion of a video sequence and searching in the second logical cache includes searching for foreground/background motion of the video sequence.

20. A cache memory system for use in a motion estimation system, comprising:

a first cache memory defined in terms of a first width and a first height; and a second cache memory defined in terms of a second width and a second height, wherein said second height is less than said first height; the second cache memory having banks of memory concatenated vertically such that their concatenated height is at least equal to the first height, and said concatenated banks being arranged to be appended to the width of the first cache memory to form a single contiguous address space.

21. A cache memory system as claimed in claim 20 wherein the first and second widths are equal.

22. A cache memory system for use in a motion estimation system, comprising:

a first cache memory defined in terms of a first width and a first height; and a second cache memory defined in terms of a second width and a second height, wherein said second height is less than said first height, the second cache memory having banks of memory stacked vertically with respect to corresponding banks of the first cache memory, and arranged to be addressed as two separate address spaces.

23. A cache memory system as claimed in claim 22 wherein the first and second widths are equal.

24. A cache memory system as claimed in claim 22 wherein each bank of the first cache memory is stacked with a corresponding one of the banks of the second cache memory, thereby forming a set of logical banks that each include one bank of the first cache memory and the corresponding bank of the second cache memory.

25. A cache memory system as claimed in claim 24 wherein the two separate address spaces are first and second address spaces, the first address space including first portions of each of the banks of the first cache memory and the second address space including the banks of the second cache memory and second portions of each of the banks of the first cache memory.

* * * * *